US012264454B2

(12) United States Patent
Stokholm

(10) Patent No.: US 12,264,454 B2
(45) Date of Patent: Apr. 1, 2025

(54) HAMMERING DEVICE AND A METHOD FOR OPERATING A HAMMERING DEVICE

(71) Applicant: Fractum ApS, Fredericia (DK)

(72) Inventor: Thorkild Duusgaard Stokholm, Jelling (DK)

(73) Assignee: Fractum ApS, Fredericia (DK)

( * ) Notice: Subject to any disclaimer, the term of this patent is extended or adjusted under 35 U.S.C. 154(b) by 0 days.

(21) Appl. No.: 18/720,313

(22) PCT Filed: Dec. 14, 2021

(86) PCT No.: PCT/DK2021/050365
§ 371 (c)(1),
(2) Date: Jun. 14, 2024

(87) PCT Pub. No.: WO2023/110036
PCT Pub. Date: Jun. 22, 2023

(65) Prior Publication Data

US 2025/0012045 A1 Jan. 9, 2025

(51) Int. Cl.
*E02F 3/96* (2006.01)
*B28D 1/26* (2006.01)
*E02D 7/08* (2006.01)

(52) U.S. Cl.
CPC ................ *E02F 3/966* (2013.01); *E02D 7/08* (2013.01); *B28D 1/26* (2013.01)

(58) Field of Classification Search
CPC .............. B28D 1/26; E02D 7/08; E02F 3/966
See application file for complete search history.

(56) References Cited

U.S. PATENT DOCUMENTS 7,331,405 B2 2/2008 Robson
2018/0305892 A1 10/2018 Robson

FOREIGN PATENT DOCUMENTS

CN 112095703 A 12/2020
EP 2182143 A2 5/2010
EP 2986783 B1 5/2017

OTHER PUBLICATIONS

International Preliminary Report on Patentabilty dated Feb. 29, 2024 in International Application No. PCT/DK2021/050365, 17 pages.

(Continued)

*Primary Examiner* — Daniel Jeremy Leeds
(74) *Attorney, Agent, or Firm* — Lee & Hayes, P.C.

(57) ABSTRACT

Disclosed is a hammering device (1) comprising a hammer (2), an elongated linear carriage guide (3) including a first guide end (4) and a second guide end (5) at eithers ends of the elongated linear carriage guide (3) and a hammer carriage (6) arranged to be displaceable back and forth along the elongated linear carriage guide (3). The hammering device (1) further comprises a lifting line (7) connected to the hammer carriage (6) and to the hammer (2), so that the hammer (2) is displaced in response to displacement of the hammer carriage (6), wherein the lifting line (7) is extending from the hammer carriage (6) in a direction towards the first guide end (4). The hammering device (1) also comprises a displacement carriage (8) arranged to be displaceable back and forth along the elongated linear carriage guide (3), and displacement means (9) connected to the displacement carriage (8) and arranged to displace the displacement carriage (8), wherein the displacement carriage (8) is arranged between the hammer carriage (6) and the first guide end (4). Furthermore, a method for operating a hammering device (1) is disclosed.

21 Claims, 4 Drawing Sheets

(56) References Cited

OTHER PUBLICATIONS

Figure 1:
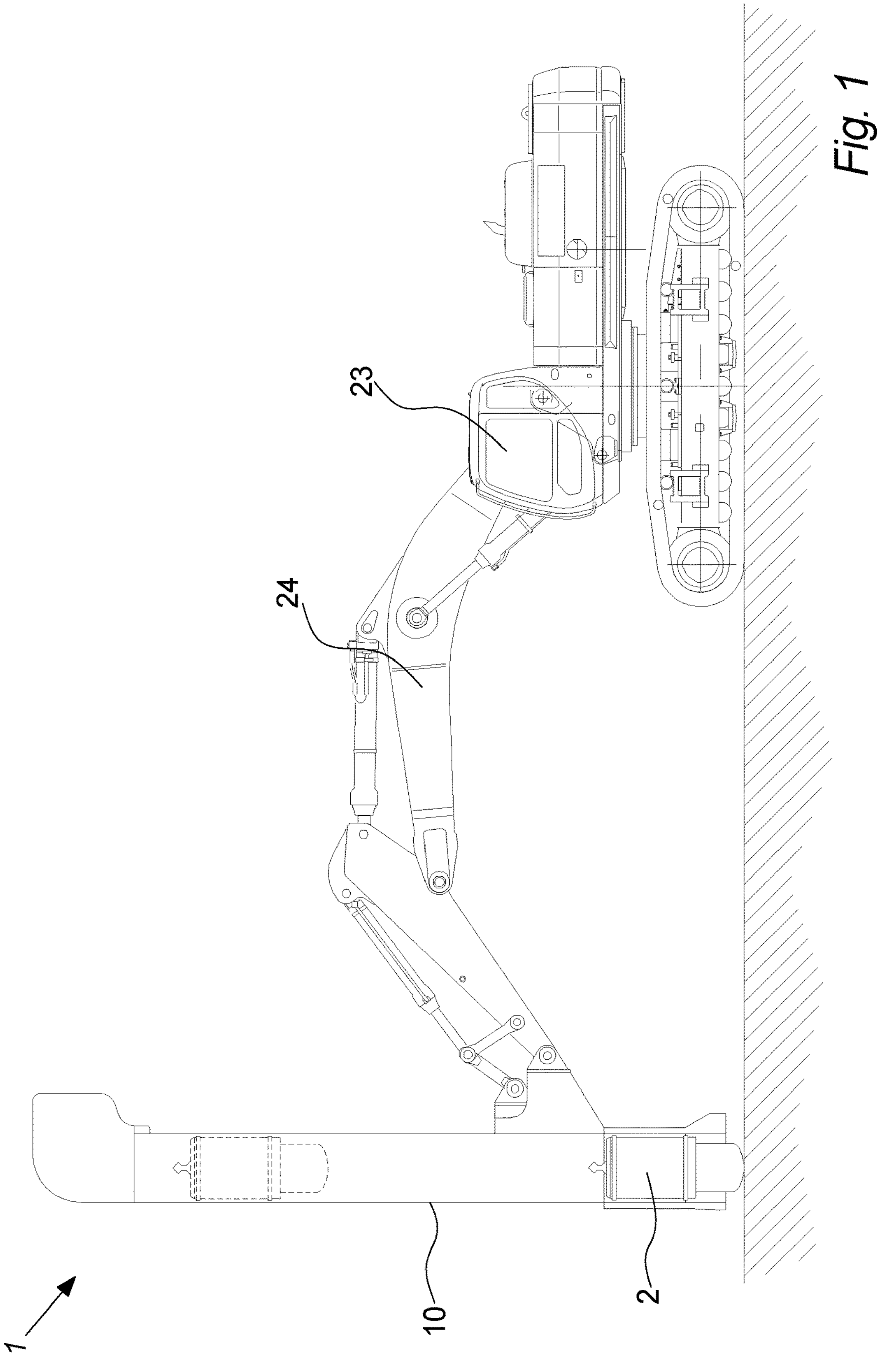

International Search Report and Written Opinion dated Aug. 8, 2022 in International Application No. PCT/DK2021/050365, 10 pages.

HAMMERING DEVICE AND A METHOD FOR OPERATING A HAMMERING DEVICE

CROSS REFERENCE TO RELATED APPLICATIONS

This application is a U.S. National Phase Application of International Application No. PCT/DK2021/050365 filed Dec. 14, 2021, which is incorporated herein by reference in its entirety.

FIELD OF THE INVENTION

The invention relates to a hammering device comprising a hammer connected to displacement means through of a lifting line. The invention further relates to a method for operating a hammering device.

BACKGROUND OF THE INVENTION

Hammering devices such as pile drivers, breakers, compactors, hydraulic hammers and the like are used for a number of purposes e.g. in the mining and quarry industry for breaking boulders and the like, in the steel industry for ladle deskulling, for slag crushing, for compacting the ground or for other purposes such as breaking up large concrete surfaces like runways, roads and factory floors.

A hammering device typically comprises a very heavy hammer traveling inside a hammer housing e.g. in the form of a large tube. The device further comprises some sort of lifting mechanism arranged to lift the hammer to a certain height where after the hammer head is released and by free fall (i.e. gravity pull) is brought to impact on an object whether it be a pile, a rock or other objects which need to be crushed or impacted.

Typically, the hammer head will have a weight of from a couple of tonnes to more than ten tonnes and in order to make such hammering devices economically attractive, it is necessary to design the device so that as much of the energy used for lifting the hammer is actually transferred to the impact.

E.g. from the US patent U.S. Pat. No. 7,331,405 B2 known to lift the hammer by means of a translation dog directly engaging the hammer during the lift after which the translation dog disengages the hammer so that it may fall freely. However, this system is prone to breakdown because of the massive forces and vibrations in play and because the translations system easily gets damaged if the hammer overshoots or bounces back.

Thus, from the US patent application US 2018/0305892 A1 it is known to lift the hammer by means of a hydraulic cylinder located on the outside of the hammer housing, wherein the cylinder is connected to the hammer by means of a strop. However, this system is not particularly energy efficient in that during the hammer drop, free fall of the hammer is hindered by the hydraulic cylinder.

It is therefore an object of the present invention to provide a cost-efficient hammering device technique alleviating the abovementioned drawbacks.

THE INVENTION

The invention provides for a hammering device comprising a hammer, an elongated linear carriage guide including a first guide end and a second guide end at eithers ends of the elongated linear carriage guide and a hammer carriage arranged to be displaceable back and forth along the elongated linear carriage guide. The hammering device further comprises a lifting line connected to the hammer carriage and to the hammer, so that the hammer is displaced in response to displacement of the hammer carriage, wherein the lifting line is extending from the hammer carriage in a direction towards the first guide end. The hammering device also comprises a displacement carriage arranged to be displaceable back and forth along the elongated linear carriage guide, and displacement means connected to the displacement carriage and arranged to displace the displacement carriage, wherein the displacement carriage is arranged between the hammer carriage and the first guide end.

By arranging the displacement carriage between the hammer carriage and the first guide end of the carriage guide it is ensured that when the displacement carriage is displaced in a direction towards the second guide end by the displacement means, the displacement carriage will make contact with the hammer carriage and thereby also force the hammer carriage in the direction towards the second guide. Since the lifting line—connected at one end to the hammer and at the other end to the hammer carriage—is arranged so that it is extending from the hammer carriage in a direction towards the first guide end of the carriage guide, the motion of the hammer carriage towards the second guide end will pull the lifting line and thereby lift the hammer. Thus, when the displacement carriage is moved in the opposite direction rapidly by the displacement means—i.e. towards the first guide end of the carriage guide—the displacement carriage will move away from the hammer carriage and enable that the hammer only has to overcome the weight of the hammer carriage when dropping. This is advantageous in that weight of the hammer carriage is very little compared to the weight of the hammer and almost all the potential energy that is build up during the lifting of the hammer can be converted into kinetic energy to be released when the hammer impacts an object. Furthermore, the controlled motion of the hammer carriage and the slight resistance the hammer carriage nevertheless will make ensures that the lifting line does not run uncontrolled and freely whereby it is ensured that the lifting line stays in place in any pulley system, guide wheels or other through which the lifting line may pass between the hammer carriage and the hammer. Furthermore, the present arrangement also enables that the drop speed of the hammer can be controlled by the traveling speed of the displacement carriage controlled by the displacement means if this is needed.

It should be emphasised that the term “lifting line” in this context should be interpreted as any kind of strop, belt, cable, rope, wire, chain or any other kind of line suitable for lifting a very heavy hammer by means of a hammer carriage.

It should be also emphasised that the term “displacement means” in this context should be interpreted as any kind of displacer capable of displacing a displacement carriage back and forth along a carriage guide. I.e. the term includes any kind of hydraulic cylinder, pneumatic cylinder, electrical actuator, winch, spindle system, gear and pinion arrangement or other or any combination thereof.

In an aspect of the invention, the hammering device further comprises a hammer housing, wherein the hammer housing is elongated, wherein the hammer is arranged to travel back and forth inside the hammer housing between a top hammer housing end and an impact hammer housing end of the elongated hammer housing.

Arranging the hammer to travel back and forth inside a hammer housing is advantageous in that the travel of the hammer is better controlled and in that the surroundings are better protected against the great forces of the moving hammer.

In an aspect of the invention, the lifting line is extending to the hammer from the top hammer housing end and wherein the hammer is arranged to impact an object at the impact hammer housing end.

Arranging the lifting line so that it is extending from the top of the hammer housing and down to the hammer is advantageous in that this enable a simple lifting process and protects the lifting line from being damaged by the motion of the hammer.

In an aspect of the invention, the elongated linear carriage guide, the hammer carriage, the displacement carriage and the displacement means are arranged external to the hammer housing.

Arranging carriage guide, the hammer carriage, the displacement carriage and the displacement means outside the hammer housing is advantageous in that these components hereby are better protected from the great forces of the moving hammer and in that these parts hereby are more easily accessible in case of maintenance or repair.

In an aspect of the invention, the elongated linear carriage guide and the displacement means are connected to an outside surface of the hammer housing.

Connecting the carriage guide and the displacement means to an outside surface of the hammer housing is advantageous in that this ensures solid and rigid connecting of the carriage guide and the displacement means and thereby ensures reliable and precise operation of the hammering device.

In an aspect of the invention, the hammering device further comprises at least one guide wheel arranged at top hammer housing end, and wherein the lifting line is extending from the hammer carriage to the at least one guide wheel and further on to the hammer.

Arranging a guide wheel at the top of the hammer housing is advantageous in that this enables that the carriage guide, the displacement means and carriages may be placed down the side of the hammer housing in parallel with the traveling path of the hammer which ensures a compact design of the hammering device.

In an aspect of the invention, the displacement means are extending from the displacement carriage and in a direction towards the second guide end of the elongated linear carriage guide.

Even if the lifting line is connected to the hammer through a set of pulleys, the stroke of the displacement means has to substantial because the hammer has to drop from a considerable height to ensure sufficient speed at impact. Thus, arranging the displacement means so that they are placed opposite the direction in which the lifting line is extending from the hammer carriage—i.e. in the direction towards the second guide end—is advantageous in that this ensures a compact design and ensures sufficient space to fit the displacement means.

In an aspect of the invention, the displacement means are arranged to extend and contract in a direction parallel with the elongated linear carriage guide.

Arranging the displacement means to extend and contract in a direction parallel with the elongated linear carriage guide is advantageous in that ensures efficient use and force transfer from the displacement means to the displacement carriage.

In an aspect of the invention, the lifting line is connected to the hammer through a set of pulleys.

The hammer has to travel a considerable distance from its impact position to its top position to ensure sufficient speed at impact when it is dropped from the top position. Thus, to reduce the stroke of the displacement means it is advantageous to connect the lifting line the hammer through a set of pulleys. Furthermore, the set of pulleys will amplify the traveling speed of the hammer carriage to the hammer to ensure faster operation.

It should be emphasised that the term “set of pulleys” in this context should be interpreted as any kind of block and tackle system or any kind of arrangement of several pulleys and/or tackles arranged so that the travel of the displacement means is amplified or decreased through the set of pulleys e.g. so that the stroke of the displacement means can be much shorter than the travel of the hammer. I.e. the term includes any kind of Gun tackle, Luff tackle, Double tackle, Gyn tackle, Threefold purchase or other pulley arrangements or any combination thereof.

In an aspect of the invention, the hammer carriage comprises at least one carriage shock absorber arranged to absorb shock between the hammer carriage and the displacement carriage.

When the displacement carriage connects with the hammer carriage or vice versa great forces are in play-particularly when the hammer carriage is pulled along the carriage guide by the hammer, the inertia of the hammer carriage will send the hammer carriage into the displacement carriage with substantial force, even if the hammer has already made impact and is no longer pulling in the hammer carriage. It is therefore advantageous to provide the hammer carriage with a carriage shock absorber to absorb shock between the hammer carriage and the displacement carriage to thereby reduce the shock at impact between the carriages and protect the carriages and/or other equipment from damage.

In an aspect of the invention, the displacement carriage comprises at least one carriage shock absorber arranged to absorb shock between the hammer carriage and the displacement carriage.

When the displacement carriage connects with the hammer carriage or vice versa great forces are in play—particularly when the hammer carriage is pulled along the carriage guide by the hammer, the inertia of the hammer carriage will send the hammer carriage into the displacement carriage with substantial force, even if the hammer has already made impact and is no longer pulling in the hammer carriage. It is therefore advantageous to provide the displacement carriage with a carriage shock absorber to absorb shock between the hammer carriage and the displacement carriage to thereby reduce the shock at impact between the carriages and protect the carriages and/or other equipment from damage.

In an aspect of the invention, the hammering device further comprises displacement carriage position detection means for detecting a position of the displacement carriage.

Providing the hammering device with displacement carriage position detection means for detecting the actual position of the displacement carriage is advantageous in that it enables that operation of the hammering device can run more controlled and it can provide an operator with information about the position of the displacement carriage so that the operator knows if the hammering device is ready for dropping the hammer.

In an aspect of the invention, the hammering device further comprises hammer carriage position detection means for detecting a position of the hammer carriage.

Providing the hammering device with hammer carriage position detection means for detecting the actual position of the displacement carriage is advantageous in that it enables that operation of the hammering device can run more controlled and it can provide an operator with information about the position of the hammer carriage so that the operator knows if the hammering device is ready for dropping the hammer.

It should be emphasised that the term "position detection means" in this context should be interpreted as any kind of position detector capable of determining one, several or all positions of the respective carriages. I.e. the term includes any kind of incremental encoder, absolute encoder, tachometer, revolution-counter, RPM gauge, proximity switch or any kind of contact or none-contact sensors capable of detecting position (by means of distance detection or detecting increments) e.g. by means of laser, light, sound, magnetism, radar or other kind or any combination thereof.

In an aspect of the invention, the displacement means comprises at least one hydraulic cylinder.

As previously explained the hammer is very heavy and hydraulic cylinders can generate a substantial for in a controlled manner while not taking up much space. Thus, hydraulic cylinders are particularly suited as displacement means in a hammering device.

In an aspect of the invention, the displacement means comprises hammer shock absorber means.

When the displacement means shoots the displacement carriage away from the hammer carriage to release the hammer carriage and enable free drop of the hammer the displacement means will move the displacement carriage so far along the carriage guide that the hammer carriage can travel freely throughout the drop of the hammer from top position to impact. However, the drop of the hammer is usually manually initiated and if the hammer is not in place above an object to be hit, the hammer may continue past the expected impact position with great force, and it is therefore advantageous to make the displacement means comprises hammer shock absorber means to dampen and/or absorb the forces of the hammer carriage hitting the displacement carriage while the hammer is still dropping.

In an aspect of the invention, the hammer carriage is connected to the elongated linear carriage guide and wherein the displacement carriage is also connected to the elongated linear carriage guide.

Connecting both the hammer carriage and the displacement carriage the same elongated linear carriage guide is advantageous in that this enables cost reduction and a more compact and simple design.

In an aspect of the invention, the lifting line is connected to the hammer carriage at a first line end and wherein the lifting line is connected directly or indirectly to the hammer at a second line end.

Connecting the lifting line to the hammer carriage at a first line end and directly or indirectly to the hammer at a second line end is advantageous in that the enable better and more controlled transfer of the forces through the lifting line.

In an aspect of the invention, the hammer carriage is separate from the displacement carriage.

Forming the hammer carriage fully separate from the displacement carriage is advantageous in that this enables more free motion of the hammer carriage and thereby less resistance during the drop of the hammer.

In an aspect of the invention, the hammering device further comprises a chisel and wherein the hammer is arranged to impact the chisel.

Making the hammering device comprise a chisel arranged to impact the object when hit by the hammer is advantageous in that the part impacting the object will inevitably be worn or deformed during impact and since the chisel does not have to be very heavy—as it is not traveling the same distance as the hammer—it is more inexpensive to replace a damaged chisel than a damaged hammer. This enables that the smaller chisel can be made in a more expensive and durable material and the chisel will also prevent the hammer from overshooting-thereby protecting the carriages and displacement means from being damaged.

The invention further provides for a method for operating a hammering device, wherein the method comprises the steps of:

- lifting a hammer of the hammering device by displacing a displacement carriage in a first direction along an elongated linear carriage guide by means of displacement means, so that the displacement carriage makes contact with a hammer carriage, so that the hammer carriage is also displaced in a first direction along the elongated linear carriage guide and so that a lifting line connecting the hammer carriage and to the hammer will lift the hammer,
- position the hammer above an object to be impacted by the hammer,
- displacing the displacement carriage in a second direction along the elongated linear carriage guide by means of the displacement means, wherein the first direction is opposite the second direction.

Lifting the hammer by means of a displacement carriage being pulled or pushed into a hammer carriage connected to the hammer through a lifting line is advantageous in that when the displacement carriage is displaced in the opposite direction the hammer only has to overcome the resistance from the hammer carriage when dropping. This ensures a very energy efficient hammering device in that the hammer hereby can drop more freely and thereby release more energy at impact.

In an aspect of the invention, the displacement carriage is displaced in the second direction by means of the displacement means at a speed that is faster that the speed the hammer carriage is displaced in the second direction by gravitational pull in the hammer.

Moving the displacement carriage away from the hammer carriage so fast that the displacement carriage moves faster than the hammer carriage moved by the gravitational pull in the hammer when the hammer drop is performed is advantageous in that hereby the hammer carriage can move freely-without being influenced by the displacement carriage during the drop of the hammer-which ensures a more energy efficient hammering device operation.

In an aspect of the invention, the hammering device is a hammering device according to any of the previously discussed hammering devices.

Hereby is achieved an advantageous embodiment of the invention.

FIGURES

Figure 2:
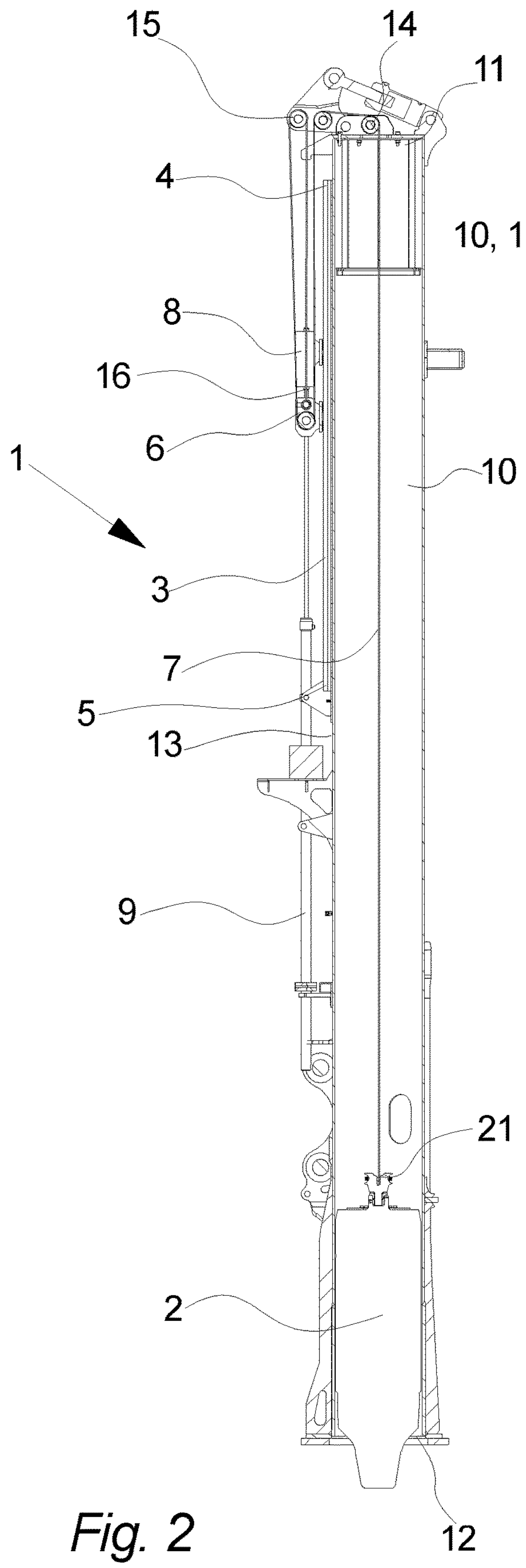
Figure 3:
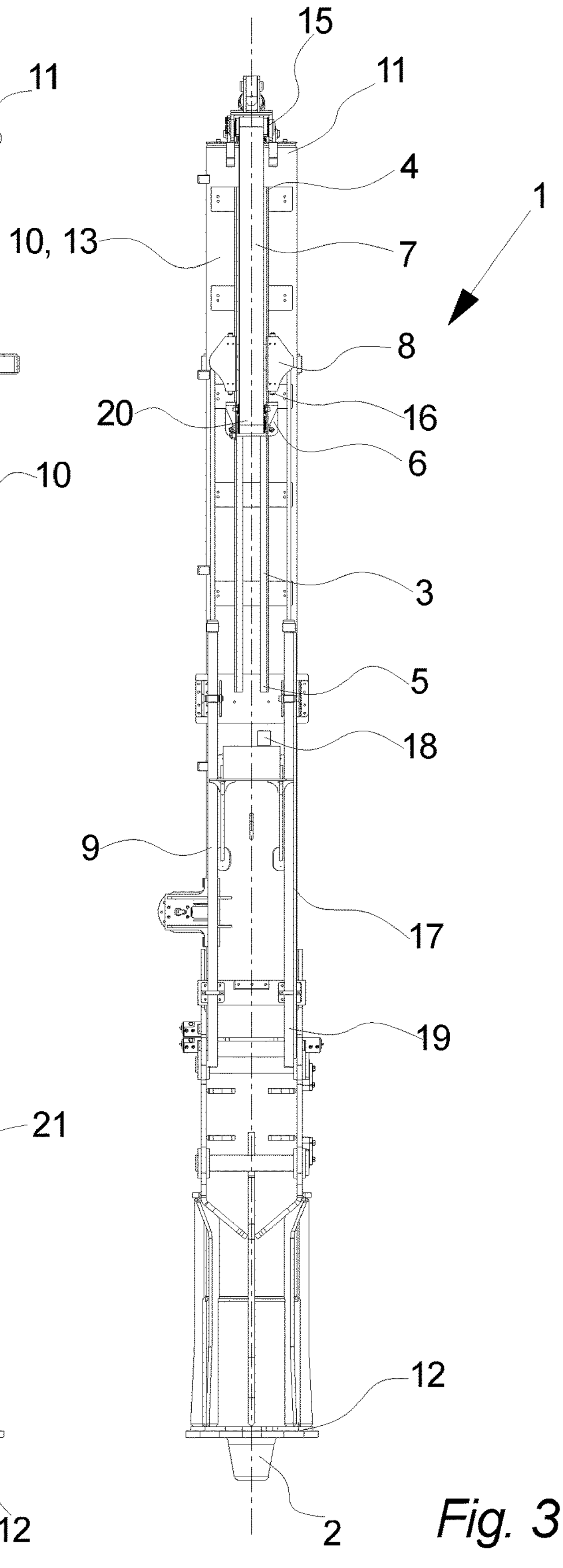
Figure 4:
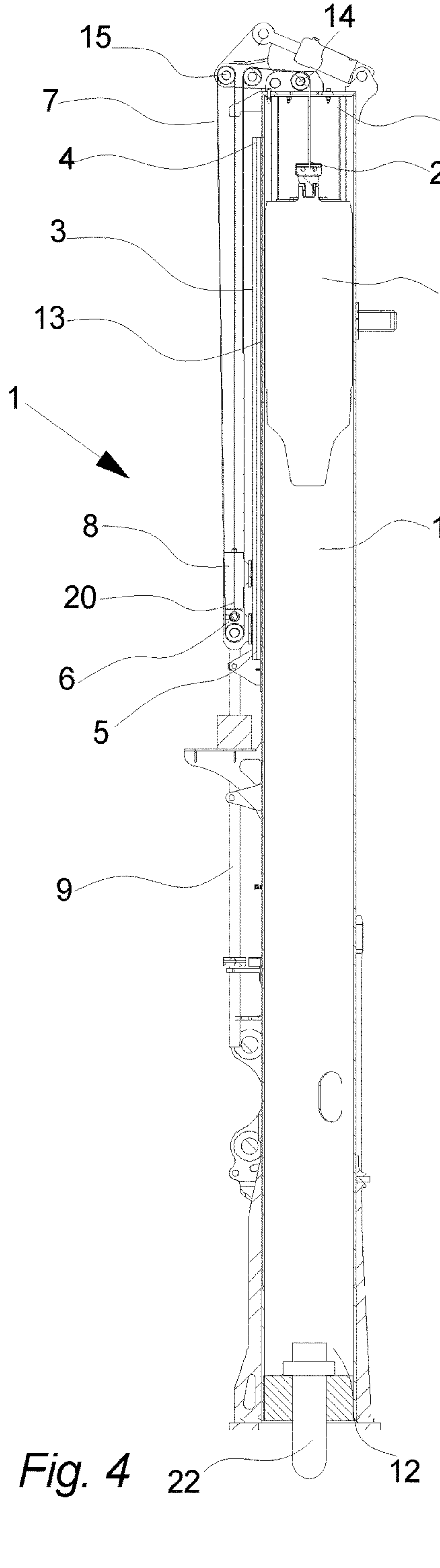
Figure 5:
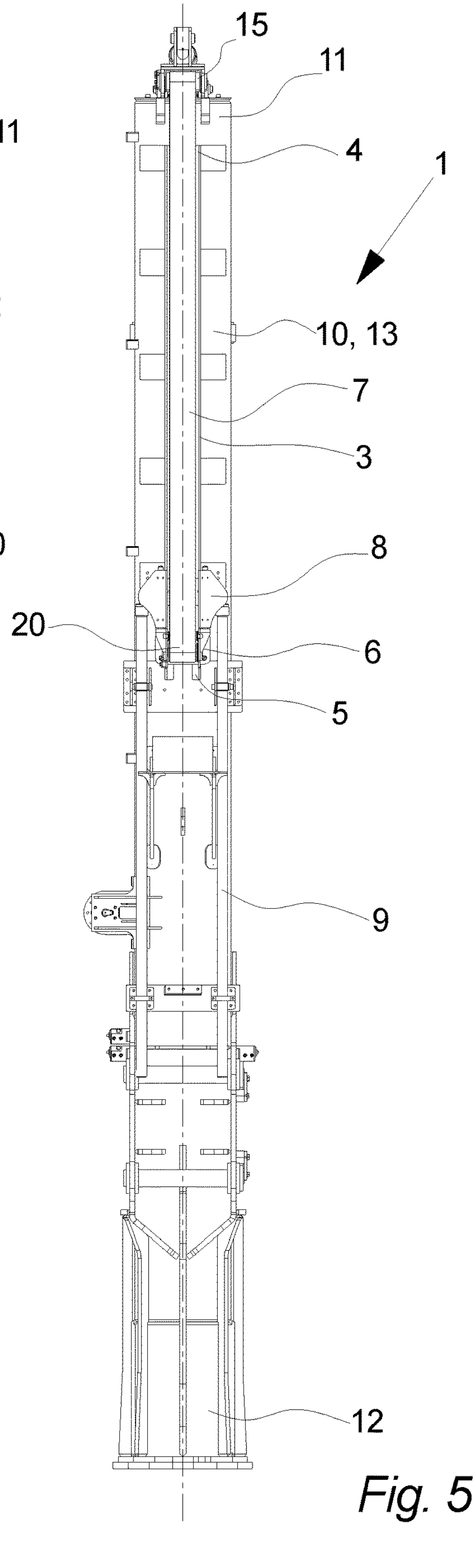
Figure 10:
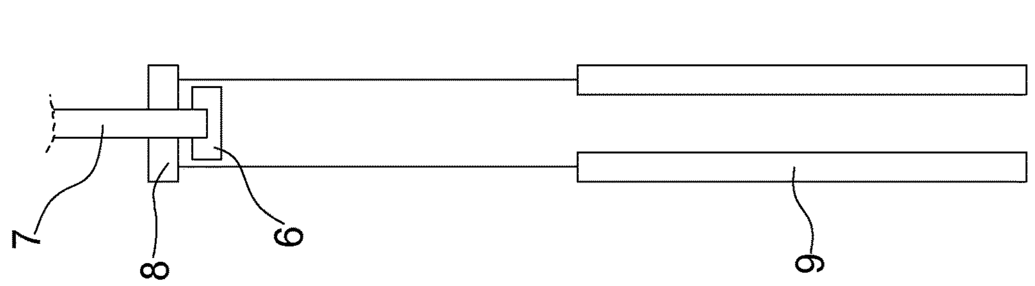
Figure 9:
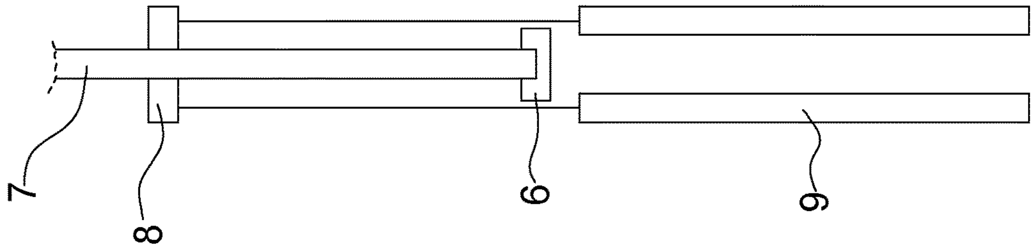
Figure 8:
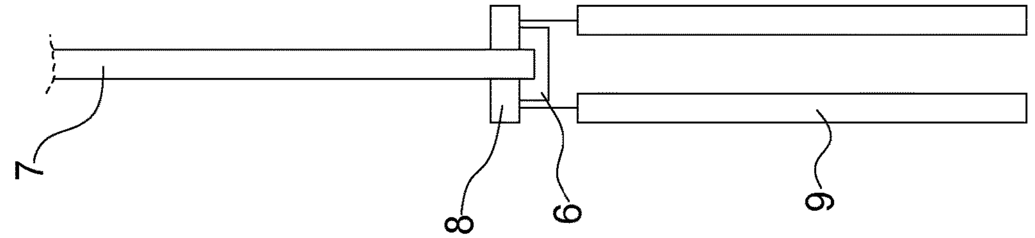
Figure 7:
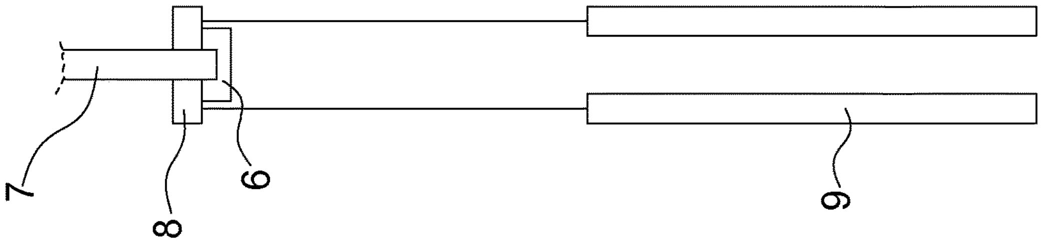
Figure 6:
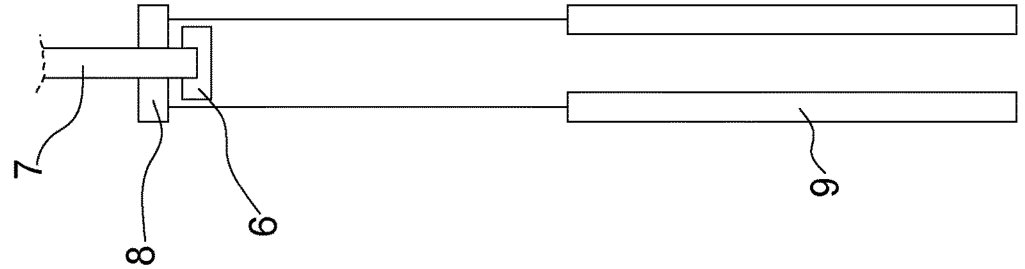

The invention will be described in the following with reference to the figures in which FIG. 1. illustrates a hammering device mounted on a heavy duty excavator, as seen from the side, FIG. 2 illustrates a cross section through the middle of a hammering device in impact position, as seen from the side, FIG. 3 illustrates a hammering device in impact position, as seen from the front, FIG. 4 illustrates a cross section through the middle of a hammering device in top position, as seen from the side, FIG. 5 illustrates a hammering device in top position, as seen from the front, FIG. 6 illustrates a simplified view of a first step in a work cycle, as seen from the front, FIG. 7 illustrates a simplified view of a second step in a work cycle, as seen from the front, FIG. 8 illustrates a simplified view of a third step in a work cycle, as seen from the front, FIG. 9 illustrates a simplified view of a fourth step in a work cycle, as seen from the front, and FIG. 10 illustrates a simplified view of a fifth step in a work cycle, as seen from the front.

DETAILED DESCRIPTION

FIG. 1 illustrates a hammering device 1 mounted on a heavy-duty excavator 23, as seen from the side.

In this embodiment the excavator 23 weighs in excess of 50 ton in order to be able to handle the large hammering device 1 mounted on the arm 24 of the excavator 23. However, in another embodiment the hammering device 1 could be mounted on an excavator 23 of another weight—both lesser or greater—, the hammering device 1 could be mounted on another mobile or stationary apparatus such as a crane, a forklift, a digger or similar or the hammering device 1 could be arranged stationary or be provided with means for making it self-propelling.

In this embodiment the hammering device 1 is supplied with oil pressure from the excavators internal oil pump but in another embodiment the hammering device 1 could be provided with its own independent oil pressurizing means or pressurized oil could be supplied from a pressurizing source external to both the excavator 23 and the hammering device 1 and/or the hammering device 1 could also or instead be supplied with electrical power, pressurized air.

Typically the hammering device 1 is first mounted on the arm 24 of the excavator 23 and the hammering device 1 is connected to the hydraulic system and/or the electrical system of the excavator 23. The operator will then initiate that the hammering device 1 will lift the hammer 2 inside the hammer housing 10 up to a top position. The top position—i.e. the height to which the hammer 2 is initially lifted—could be chosen by the operator, it could be defined on basis of the latest impact position, it could be a fixed position inside the hammer housing 10 or the initial position could be chosen or determined in another way. The excavator 23 then moves the hammering device 1 to the place of use and places the hammering device 1 so that the hammer housing 10 rests on the object to be hammered on or places the bottom of the hammer housing 10 immediately above the object. The operator then initiates the hammering process in the form of a single blow, a predefined series of blows or that the hammering process continues until the operator stops it again.

In the hammering process the hammer 2 is first dropped from its initial position where after gravity will pull the hammer 2 downwards until the hammer 2 hits the object over which the hammering device 1 is placed. Immediately thereafter the hammer 2 is lifter up to the initial position and e.g. dropped again. In an embodiment the actual impact position is determined each time the hammer 2 hits the object and the initial position is then adjusted accordingly to ensure that the hammer 2 travels substantially the same distance each time and thus delivers substantially the same amount of energy. The travel distance could also be continuously adjusted by the operator.

FIG. 2 illustrates a cross section through the middle of a hammering device 1 in impact position, as seen from the side and FIG. 3 illustrates a hammering device 1 in impact position, as seen from the front.

In this embodiment the hammer housing 10 is formed as a tube i.e. an elongated cylinder having an inside diameter a little greater than the outer diameter of the hammer 2. The hammer housing 10 ensures that the hammer 2 travels up and down along a predefined path and in another embodiment the hammer housing 10 could instead or also comprise rails, guidance or other or the tube and/or the hammer 2 could be formed with a square, a polygonal, an oval or another cross section. Or the hammering device could be formed without a hammer housing 10 if the hammer 2 was suspended by the lifting device—to be discussed in the following—arranged directly above the hammer 2 or if the hammer 2 was arranged to travel in a lattice work or being suspended from an arm.

In this embodiment the hammering device 1 is provided with an elongated linear carriage guide 3 comprising a first guide end 4 in the direction of the top end 11 of the hammer housing 10 and a second guide end 5 arranged at the opposite end of the carriage guide 3—i.e. the end 5 of the carriage guide 3 pointing towards the impact end 12 of the hammer housing 10.

In this embodiment a hammer carriage 6 and a displacement carriage 8 are connected to the carriage guide 3 so that they are displaceable back and forth along the carriage guide 3. However, in another embodiment more than one carriage guide 3 could be provided, and the hammer carriage 6 and a displacement carriage 8 could run on different carriage guides 3. In this embodiment the carriage guide 3 are V-guide rails being engaged by V-rollers arranged on the carriages 6, 8 but in another embodiment the carriage guide 3 could also or instead comprise another form of linear guide rails or guide rods being engaged by suitable guide wheels or guide sleeves arranged on the carriages 6, 8 or the carriage guide 3 could be realised in numerous other ways known to the skilled person.

In this embodiment a lifting line 7 is connecting the hammer carriage 6 to the hammer 2 through a guide wheel 14 and a set of pulleys 15 so that the hammer 2 is displaced in response to displacement of the hammer carriage 6. But due to the set of pulleys 15 a short travel of the hammer carriage 6 translates into a greater travel of the hammer 2 and the traveling speed of the hammer 2 is amplified in relation to the traveling speed of the hammer carriage 6. However, in another embodiment the top of the hammer housing 10 would only be provided with the guide wheel 14 or the set of pulleys 15 could be designed differently.

In this embodiment the lifting line 7 runs continuous from a first line end 20 connected to the hammer carriage 6, through the set of pulleys 15 and to a second line end 21 connected to the hammer 2 but in another embodiment the lifting line 7 could e.g. run from the hammer carriage 6 to a movable wheel, around which another lifting line 7 would extend and to the hammer 2—i.e. in another embodiment the lifting line 7 could be divided into several lifting line parts.

In this embodiment the lifting line 7 is a single belt but in another embodiment the hammering device could comprise more than one lifting line 7—such as two, three, four or even more—and/or the lifting line could also or instead comprise a rope, a wire, a chain or other.

In this embodiment the hammering device 1 also comprises displacement means 9 in the form of two hydraulic cylinders connected to the displacement carriage 8 so that the displacement means 9 may force the displacement carriage 8 back and forth along the carriage guide 3. However, in another embodiment the displacement means 9 could comprise another number of hydraulic cylinders and/or the displacement means 9 could also or instead comprise a winch, a motor driven gear and pinion arrangement, a motor driven timing belt or other.

In this embodiment the displacement means 9 are extending from the displacement carriage 8 and in a direction towards the second guide end 5 of the elongated linear carriage guide 3 so that the displacement means 9 will pull the displacement carriage 8 and thereby the hammer carriage 6 to lift the hammer 2. However, in another embodiment the displacement means 9 could be arranged in the opposite direction so that they would push the displacement carriage 8 and thereby the hammer carriage 6 to lift the hammer 2.

In this embodiment the displacement means 9 are arranged to extend and contract in a direction parallel with the elongated linear carriage guide 3 but in another embodiment the displacement means 9 could be arranged to act in another direction—e.g., slightly tilted in relation to the direction of the carriage guide 3.

In this embodiment the displacement carriage 8 also comprises two carriage shock absorbers 16 arranged to absorb shock between the hammer carriage 6 and the displacement carriage 8 when the two carriages 6, 8 makes contact. However, in another embodiment the carriage shock absorbers 16 could also or instead be arranged on the hammer carriage 6 and/or another number of carriage shock absorbers 16 could be provided such as one, three, four or even more.

In this embodiment the hammering device 1 further comprises displacement carriage position detection means 17 in the form of an array of proximity sensors arranged on one of the hydraulic cylinders to detect the position of the cylinder's piston and thereby the position of the displacement carriage 8. And in this embodiment the hammering device 1 further comprises hammer carriage position detection means 18 in the form of a laser distance sensor arranged for detecting the actual position of the hammer carriage 6. However, in another embodiment the displacement carriage position detection means 17 and/or the hammer carriage position detection means 18 could also or instead comprise other kinds of sensors. E.g. if the displacement means 9 comprised a winch, this winch could be provided with an encoder to track the position of the displacement carriage 8 and/or an encoder placed on the guide wheel 14 could track the position of the hammer carriage 6 through the motion of the lifting line 7.

In this embodiment the elongated linear carriage guide 3 and the displacement means 9 are connected to the outside surface 13 of the hammer housing 10 but in another embodiment the carriage guide 3 and the displacement means 9 could be connected to the inside surface 13 of the hammer housing 10 or to something other than the hammer housing 10.

In this embodiment the displacement carriage 8 is arranged between the hammer carriage 6 and the first guide end 4 of the carriage guide 3 and since the lifting line 7 is extending from the hammer carriage 6 in the direction of the first guide end 4 of the carriage guide 3, the hammer carriage 6 will be pushed in the direction of second guide end 5 by the displacement carriage 8 when the displacement carriage 8 is moved towards the second guide end 5 by the displacement means 9. Thereby the hammer carriage 6 will pull the lifting line 7 and elevate the hammer 2 by means of the forces provided by the displacement means 9.

In this embodiment the displacement means 9 comprises hammer shock absorber means 19 in that when the displacement carriage 8 is in a top position—i.e. a position a bit higher than where the hammer carriage 6 normally will arrive at when the hammer 2 has reached its impact position as disclosed in FIGS. 2 and 3—the displacement means 9 are actually not fully extended. Thus, if the hammer 2 overshoots its impact position, the hammer carriage 6 will hit the displacement carriage 8 and push it upwards and in this embodiment the displacement means 9 are arranged to extend further in the direction of the first guide end 4 of carriage guide 3—i.e. upwards in this case—while it provides resistance that will dampen the shock of the collision between the hammer carriage 6 and the displacement carriage 8 and eventually stop further displacement. These hammer shock absorber means 19 could be adjustable in the form of an adjustable reduction valve on the port of the cylinder chamber containing the piston rod. However, in another embodiment the hammer shock absorber means 19 could comprise a winch damping system in case the displacement means 9 comprises a winch or the hammer shock absorber means 19 could be separate shock absorbers arranged at the first guide end 4 of carriage guide 3 or the hammer shock absorber means 19 could be realised in another way.

FIG. 4 illustrates a cross section through the middle of a hammering device 1 in top position, as seen from the side and FIG. 5 illustrates a hammering device 1 in top position, as seen from the front.

In this embodiment the displacement means 9 has drawn the displacement carriage 8 downwards so that it makes contact with the hammer carriage 6 and draws both carriages 6, 8 downwards to thereby pull the hammer 2 up in top position.

In the embodiment disclosed in FIG. 4, the hammering device 1 further comprises a chisel 22 arranged at the impact end 12 of the hammer housing 10. I.e. in this embodiment the operator will arrange the hammering device 1 so that the chisel 22 is pushed a bit into the hammer housing 10 by the object to be hit, after which the hammer is released by pushing the displacement carriage 8 upwards rapidly so that the hammer 2 will impact the chisel 22 which in turn will impact the object.

FIG. 6-10 illustrates simplified views of first to fifth steps in a work cycle of a hammering device 1, as seen from the front.

In this embodiment a normal work cycle of the hammering device 1 first comprises the step disclosed in FIG. 6 in which the hammer (not shown) is in an impact position at the bottom of the hammer housing (not shown) and the hammer carriage 6 is in a top position.

FIGS. 7 and 8 disclose that the displacement means 9 are pulling the displacement carriage 8 downwards to make it impact the hammer carriage 6 to pull the hammer carriage 6 along downwards till a bottom position has been reached. The hammer carriage 6 is connected to the hammer (not shown) by means of the lifting line 7 so when the hammer carriage 6 is pulled downwards, the hammer is raised. It should be noted that in FIGS. 6-10 the carriages 6, 8 etc. are arranged on the outside of the hammer housing as disclosed in FIGS. 2-5 but in another embodiment the arrangement disclosed in FIGS. 6-10 could be turned upside down and the hammer (not shown) could be connected directly to the end of the lifting line 7 shown in FIGS. 6-10 at the dotted line.

FIG. 9 discloses that a hammer drop has been initiated, and the displacement means 9 pushes the displacement carriage 8 rapidly upwards so that the hammer carriage 6 may move freely while being pulled upwards by the dropping hammer.

FIG. 10 discloses that the hammer (not shown) has made impact and the hammer carriage 6 has thereby reached its top position and is ready to be pushed down again.

The invention has been exemplified above with reference to specific examples of hammering devices 1, displacement means 9, carriages 6, 8 and other. However, it should be understood that the invention is not limited to the particular examples described above but may be designed and altered in a multitude of varieties within the scope of the invention as specified in the claims.

LIST

1. Hammering device
2. Hammer
3. Carriage guide
4. First guide end of carriage guide
5. Second guide end of carriage guide
6. Hammer carriage
7. Lifting line
8. Displacement carriage
9. Displacement means
10. Hammer housing
11. Top hammer housing end
12. Impact hammer housing end
13. Outside surface of hammer housing
14. Guide wheel
15. Set of pulleys
16. Carriage shock absorber
17. Displacement carriage position detection means
18. Hammer carriage position detection means
19. Hammer shock absorber means
20. First line end
21. Second line end
22. Chisel
23. Excavator
24. Excavator arm

The invention claimed is:

1. A hammering device comprising a hammer, an elongated linear carriage guide comprising a first guide end and a second guide end at eithers ends of said elongated linear carriage guide, a hammer carriage arranged to be displaceable back and forth along said elongated linear carriage guide, a lifting line connected to said hammer carriage and to said hammer, wherein said hammer carriage is connected to said hammer by means of said lifting line so that said hammer is displaced in response to displacement of said hammer carriage, wherein said lifting line is extending from said hammer carriage in a direction towards said first guide end, a displacement carriage arranged to be displaceable back and forth along said elongated linear carriage guide, wherein said hammer carriage is separate from said displacement carriage, a displacer connected to said displacement carriage and arranged to displace said displacement carriage, wherein said displacement carriage is arranged between said hammer carriage and said first guide end so that when said displacement carriage is displaced in a direction towards said second guide end by said displacer, said displacement carriage will make contact with said hammer carriage and thereby also force said hammer carriage in said direction towards said second guide end.

2. The hammering device according to claim 1, wherein said hammering device further comprises a hammer housing, wherein said hammer housing is elongated, wherein said hammer is arranged to travel back and forth inside said hammer housing between a top hammer housing end and an impact hammer housing end of said elongated hammer housing.

3. The hammering device according to claim 2, wherein said lifting line is extending to said hammer from said top hammer housing end and wherein said hammer is arranged to impact an object at said impact hammer housing end.

4. The hammering device according to claim 2, wherein said elongated linear carriage guide, said hammer carriage, said displacement carriage and said displacer are arranged external to said hammer housing.

5. The hammering device according to claim 2, wherein said elongated linear carriage guide and said displacer are connected to an outside surface of said hammer housing.

6. The hammering device according to claim 2, wherein said hammering device further comprises at least one guide wheel arranged at said top hammer housing end, and wherein said lifting line is extending from said hammer carriage to said at least one guide wheel and further on to said hammer.

7. The hammering device according to claim 1, wherein said displacer is extending from said displacement carriage and in a direction towards said second guide end of said elongated linear carriage guide.

8. The hammering device according to claim 1, wherein said displacer is arranged to extend and contract in a direction parallel with said elongated linear carriage guide.

9. The hammering device according to claim 1, wherein said lifting line is connected to said hammer through a set of pulleys.

10. The hammering device according to claim 1, wherein said hammer carriage comprises at least one carriage shock absorber arranged to absorb shock between said hammer carriage and said displacement carriage.

11. The hammering device according to claim 1, wherein said displacement carriage comprises at least one carriage shock absorber arranged to absorb shock between said hammer carriage and said displacement carriage.

12. The hammering device according to claim 1, wherein said hammering device further comprises a displacement carriage position detector for detecting a position of said displacement carriage.

13. The hammering device according to claim 1, wherein said hammering device further comprises a hammer carriage position detector for detecting a position of said hammer carriage.

14. The hammering device according to claim 1, wherein said displacer comprises at least one hydraulic cylinder.

15. The hammering device according to claim 1, wherein said displacer comprises a hammer shock absorber.

16. The hammering device according to claim 1, wherein said hammer carriage is connected to said elongated linear carriage guide and wherein said displacement carriage is also connected to said elongated linear carriage guide.

17. The hammering device according to claim 1, wherein said lifting line is connected to said hammer carriage at a first line end and wherein said lifting line is connected directly or indirectly to said hammer at a second line end.

18. The hammering device according to claim 1, wherein said hammering device further comprises a chisel and wherein said hammer is arranged to impact said chisel.

19. A method for operating a hammering device, wherein said method comprising the steps of:

lifting a hammer of said hammering device by displacing a displacement carriage in a first direction along an elongated linear carriage guide by means of a displacer so that said displacement carriage makes contact with a hammer carriage, so that said hammer carriage is also displaced in a first direction along said elongated linear carriage guide and so that a lifting line connecting said hammer carriage to said hammer will lift said hammer, wherein said hammer carriage is separate from said displacement carriage, position said hammer above an object to be impacted by said hammer, displacing said displacement carriage in a second direction along said elongated linear carriage guide by means of said displacer, wherein said first direction is opposite said second direction.

20. The method according to claim 19, wherein said displacement carriage is displaced in said second direction by means of said displacer at a speed that is faster than the speed said hammer carriage is displaced in said second direction by gravitational pull in said hammer.

21. The method according to claim 19, wherein said hammering device is a hammering device comprising a hammer, an elongated linear carriage guide comprising a first guide end and a second guide end at eithers ends of said elongated linear carriage guide, a hammer carriage arranged to be displaceable back and forth along said elongated linear carriage guide, a lifting line connected to said hammer carriage and to said hammer, wherein said hammer carriage is connected to said hammer by means of said lifting line so that said hammer is displaced in response to displacement of said hammer carriage, wherein said lifting line is extending from said hammer carriage in a direction towards said first guide end, a displacement carriage arranged to be displaceable back and forth along said elongated linear carriage guide, wherein said hammer carriage is separate from said displacement carriage, a displacer connected to said displacement carriage and arranged to displace said displacement carriage, wherein said displacement carriage is arranged between said hammer carriage and said first guide end so that when said displacement carriage is displaced in a direction towards said second guide end by said displacer, said displacement carriage will make contact with said hammer carriage and thereby also force said hammer carriage in said direction towards said second guide end.

* * * * *